United States Patent [19]

Shinbashi et al.

[11] Patent Number: 5,014,261

[45] Date of Patent: May 7, 1991

[54] SYSTEM FOR SWITCHING FROM WORKING UNITS TO STAND-BY UNITS

[75] Inventors: Masahiro Shinbashi, Kawasaki; Takashi Wakabayashi, Yokohama, both of Japan

[73] Assignee: Fujitsu Limited, Kawasaki, Japan

[21] Appl. No.: 336,614

[22] Filed: Apr. 6, 1989

Related U.S. Application Data

[63] Continuation of Ser. No. 1,029, Jan. 7, 1987, abandoned.

[30] Foreign Application Priority Data

Jan. 7, 1986 [JP] Japan .................. 61-000306

[51] Int. Cl.$^5$ .............................. H04J 03/14
[52] U.S. Cl. ........................ 370/16; 371/8.1
[58] Field of Search .............. 370/16; 371/8, 8.1; 340/825.01, 825.07

[56] References Cited

U.S. PATENT DOCUMENTS

| | | | |
|---|---|---|---|
| 3,364,467 | 1/1968 | Haibt et al. | 371/8 |
| 4,160,127 | 7/1979 | Slana et al. | 370/16 |
| 4,245,342 | 1/1982 | Entenman | 370/16 |
| 4,412,323 | 10/1983 | Abbott et al. | 370/16 |
| 4,633,246 | 12/1986 | Jones et al. | 370/16 |
| 4,648,088 | 3/1987 | Cagle et al. | 370/16 |
| 4,658,396 | 4/1987 | Barden | 370/16 |

Primary Examiner—Douglas W. Olms
Assistant Examiner—T. Samuel
Attorney, Agent, or Firm—Staas & Halsey

[57] ABSTRACT

A switching system for switching from a unit or units in a working state to a unit or units in a stand-by state in which the units in a stand-by state are provided as either individual stand-by units or as common stand-by units. An individual stand-by unit or a switching unit can be accommodated at a position at which it forms a pair with a working unit, and a working unit or units which are to be connected to a switching unit upon the occurrence of failure of the working unit or units are automatically connected to a common stand-by unit.

6 Claims, 11 Drawing Sheets

CONNECTION FOR INDIVIDUAL STAND-BY UNITS

CONNECTION FOR COMMON STAND-BY UNIT

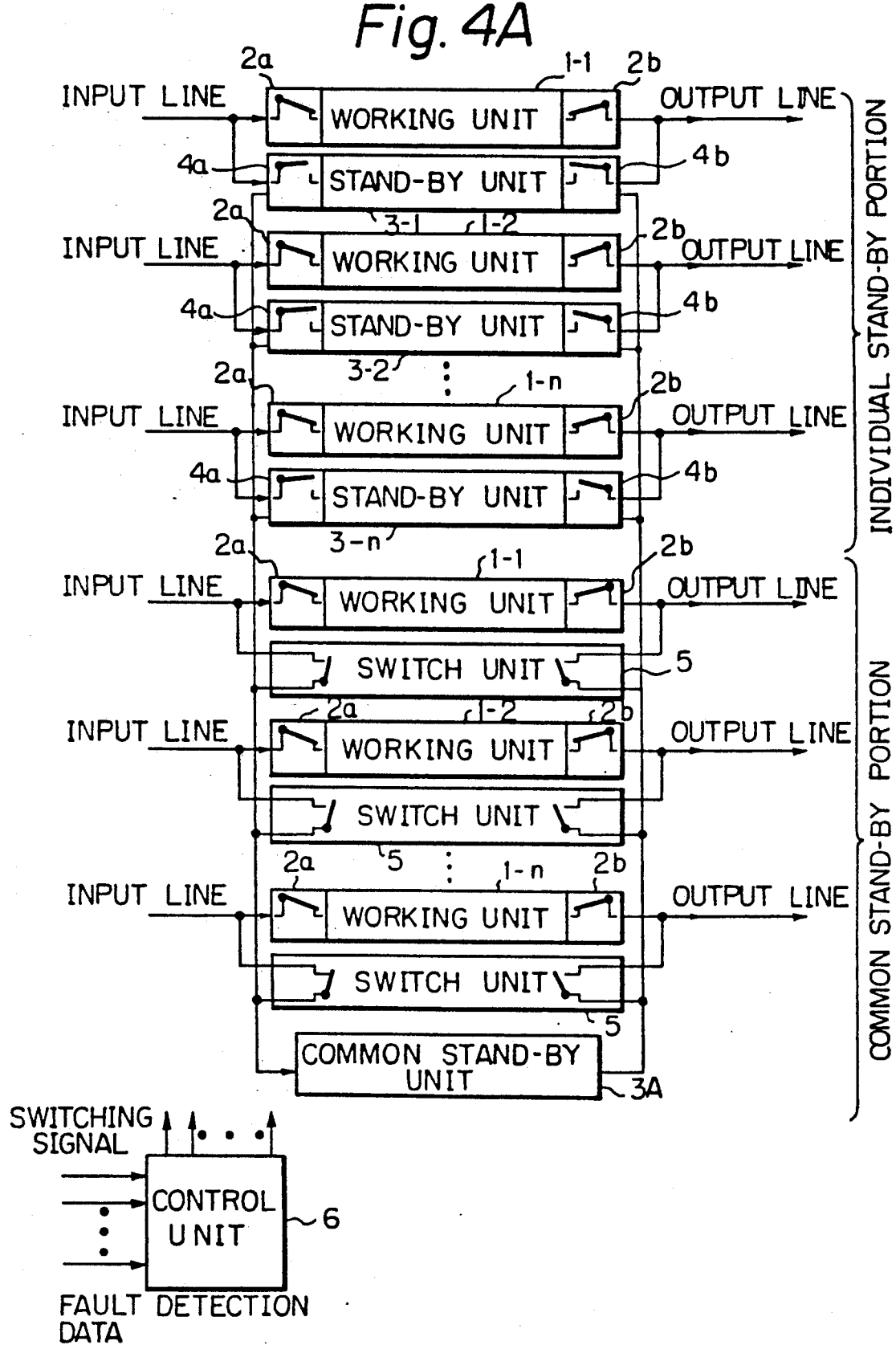

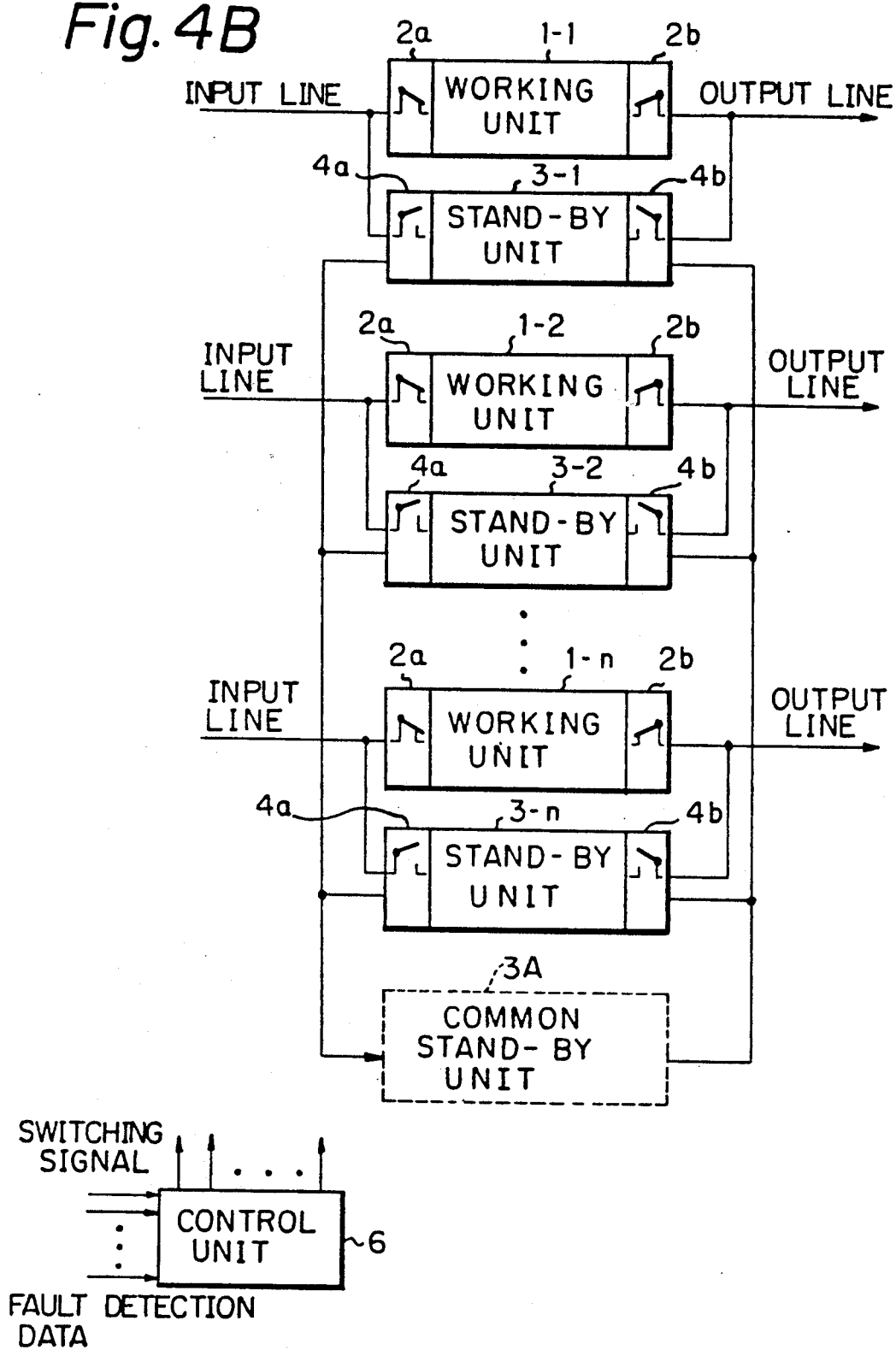

STRUCTURE OF CIRCUIT FOR 1-To-1 SWITCHING

STRUCTURE OF CIRCUIT FOR 1-To-n SWITCHING

Fig. 8A   SWITCHING CIRCUIT
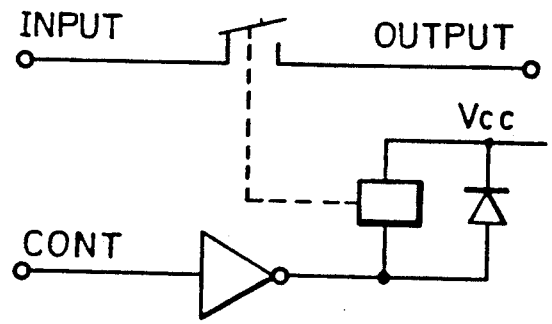
Fig. 8B   SWITCHING CIRCUIT
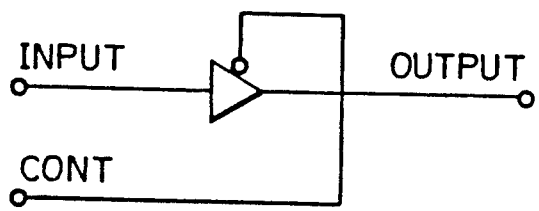
Fig. 8C   SWITCHING CIRCUIT
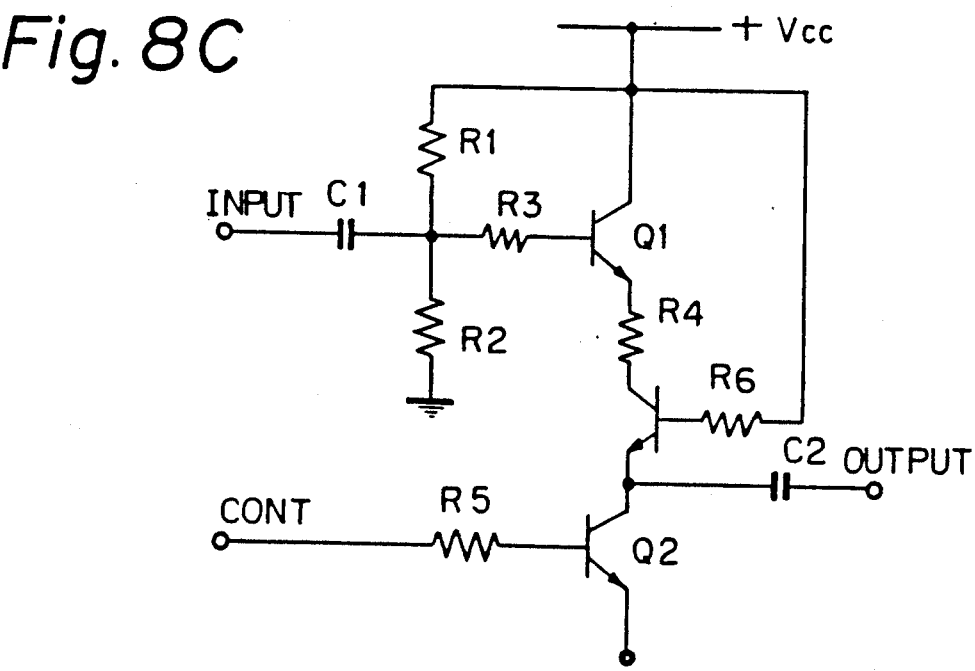

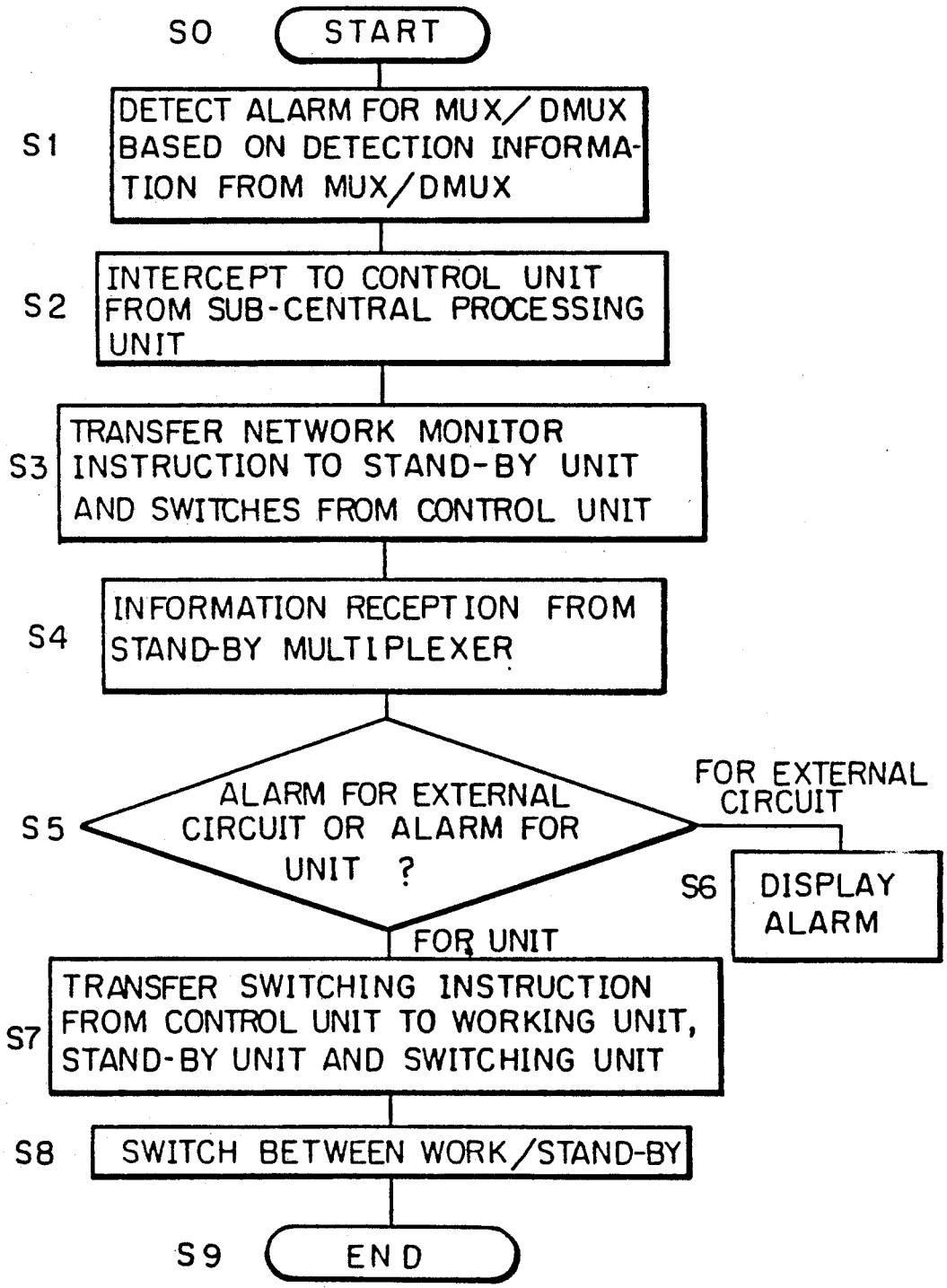

SYSTEM FOR SWITCHING FROM WORKING UNITS TO STAND-BY UNITS

This is a continuation of co-pending application Ser. No. 1,029 filed on Jan. 7, 1987 now abandoned.

BACKGROUND OF THE INVENTION

1. Field of the Invention

The present invention relates to a control system for switching between working units and stand-by units, and more particularly, to a system which can realize a change-over constitution between working units and stand-by units in response to the degree of importance of the working unit, especially in a digital multiplex equipment having a plurality of units for multiprocessing signals, such as multiplexing or demultiplexing operations.

2. Description of the Related Arts

In recent semiconductor technology, a large number of circuits are integrated to form, for example, a multiplexing portion or a demultiplexing portion in a multiplex network; these integrated circuits being mounted on a printed circuit board to form a unit. A plurality of these units are contained in one package, in accordance with the number of multiplexing lines in use, to form a multiplexer unit or a demultiplexer unit. Obviously, in such a unit-using structure, a stand-by unit must be provided to improve the reliability of the package, by switching from a working unit to a stand-by unit when a fault occurs in the working unit. In this description, the term "working unit" denotes a unit currently in operation.

In data communication, a multiplexer or a multiplexer unit is provided in which a plurality of data transmission lines are multiplexed to enable the forming of a faster data transmission line, and this multiplexer possesses both multiplexing and demultiplexing functions.

A multiplexer is conventionally used as shown in FIG. 1. For example, data of 1,544 MB/sec is transmitted via four lines to a first multiplexing circuit (e.g., M12), the output of which is multiplexed to transmit data of 6,312 MB/sec to a second multiplexing circuit (e.g., M23) via seven circuits. The seven first multiplexing circuits and the second multiplexing circuit form a multiplexer unit such as M13 MUX. Further, nine multiplexer units are combined therewith to form a third multiplexer unit. Then, twenty-eight lines of data are multiplexed by seven multiplexing circuits M23 to output data of 45 MB/sec, and further, via nine lines for data of 45 MB/sec, multiplexing is carried out via data transmission lines to output data (e g. 405 MB/sec).

In general, the change-over operation or switching operation between working units and stand-by units is carried out as follows.

(1) 1-to-1 switching structure

This is a structure in which a stand-by unit is provided for one working unit.

(2) n-to-1 switching structure

This is a structure in which a stand-by unit is provided for $n$ working units to form an $n$-to-1 switching structure.

The 1-to-1 switching structure is applied to a working unit having a relatively high importance, and the $n$-to-1 switching structure is applied to a working unit having a relatively low importance. A unit having a high importance is one utilized, in particular, for an administrative office, a fire department, military forces, and a police station or the like.

(3) $n$-to-$m$ switching structure

This is a structure in which $m$ standby units are provided for $n$ working units. This structure has an unavoidable problem in that the switching structure between the working unit and the stand-by unit is very complicated.

In a prior art switching technique between the working units and the stand-by units, stand-by units are pre-packaged in accordance with the degree of importance of the working units; i.e., the 1-to-1 or $n$-to-1 switching structure is formed. Therefore, the switching structure must be designed and manufactured to fit many kinds of systems. Moreover, even if the working unit has a low importance, more stand-by units than necessary must be packaged, and thus incurs a disadvantage of an uneconomical structure. On the contrary, when the importance of working units is high, each working unit must have a stand-by unit appended thereto.

The connections for individual stand-by units and for a common stand-by unit in the prior art are illustrated in FIGS. 2 and 3.

In FIG. 2 the individual stand-by units are connected in parallel with or in accordance with a plurality of working units through input side switch elements SWI−1 to SWI−$n$ and output side switch elements SWO−1 to SWO−$n$, and a control circuit is connected to all of the input side switch element and all of the output side switch element.

In FIG. 3 a common stand-by unit is connected to a plurality of working units through a plurality of input side gates SWI−1 to SWI−$n$ and a plurality of output side gates SWO−1 to SWO−$n$.

SUMMARY OF THE INVENTION

It is an object of the present invention to provide an improved switching system in which the switching from a working unit to an individual stand-by unit or to a common stand-by unit is carried out in correspondence with the degree of importance of the working unit.

In accordance with the present invention, there is provided a switching system for switching from a unit or units in a working state to a unit or units in a stand-by state in which the units in a stand-by state are provided as either individual stand-by units or as a common stand-by unit, an individual stand-by unit or a switching unit being able to be accommodated at a position in which said unit forms a pair with a working unit, and working unit or units which are connected to a switching unit upon occurrence of a failure of the working unit, or the units being automatically connected to a common stand-by unit.

Therefore, in accordance with the present invention, region in which the stand-by units are accommodated is provided in accordance with the working units, wherein the stand-by unit is provided for the working unit having a high degree of importance on a 1-to-1 basis, and a common stand-by unit is provided for the working unit having a low degree of importance. Subsequently, a switching unit which carries out a switching and connection operation with the common stand-by unit, is accommodated in the accommodation region of the stand-by unit for the work units.

BRIEF DESCRIPTION OF THE DRAWINGS

FIGS. 4A, 4B, and 4C are block diagrams showing embodiments of the present invention, wherein FIG. 4A is for the case of working units, individual stand-by units, and a common stand-by unit, FIG. 4B is for the case of working units and individual stand-by units, and FIG. 4C is for the case of working unit and a common stand-by unit;

FIGS. 8A, 8B and 8C show examples of the switch circuit; and

FIG. 9 is a flow chart of an example of the operation of the system according to the present invention.

DESCRIPTION OF THE PREFERRED EMBODIMENTS

Figure 1:
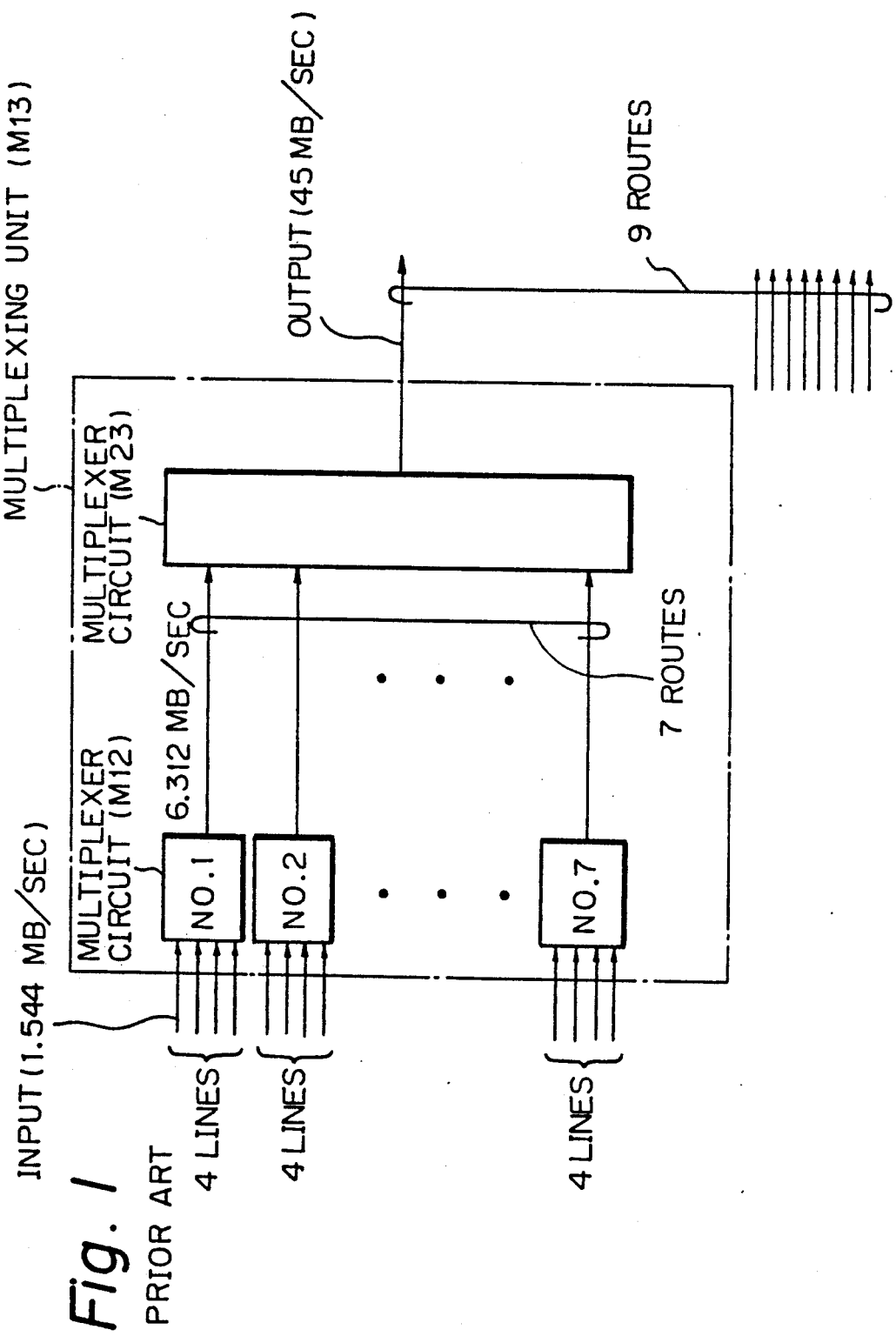
FIG. 1 is a functional diagram of a prior art multiplexer.
Figure 2:
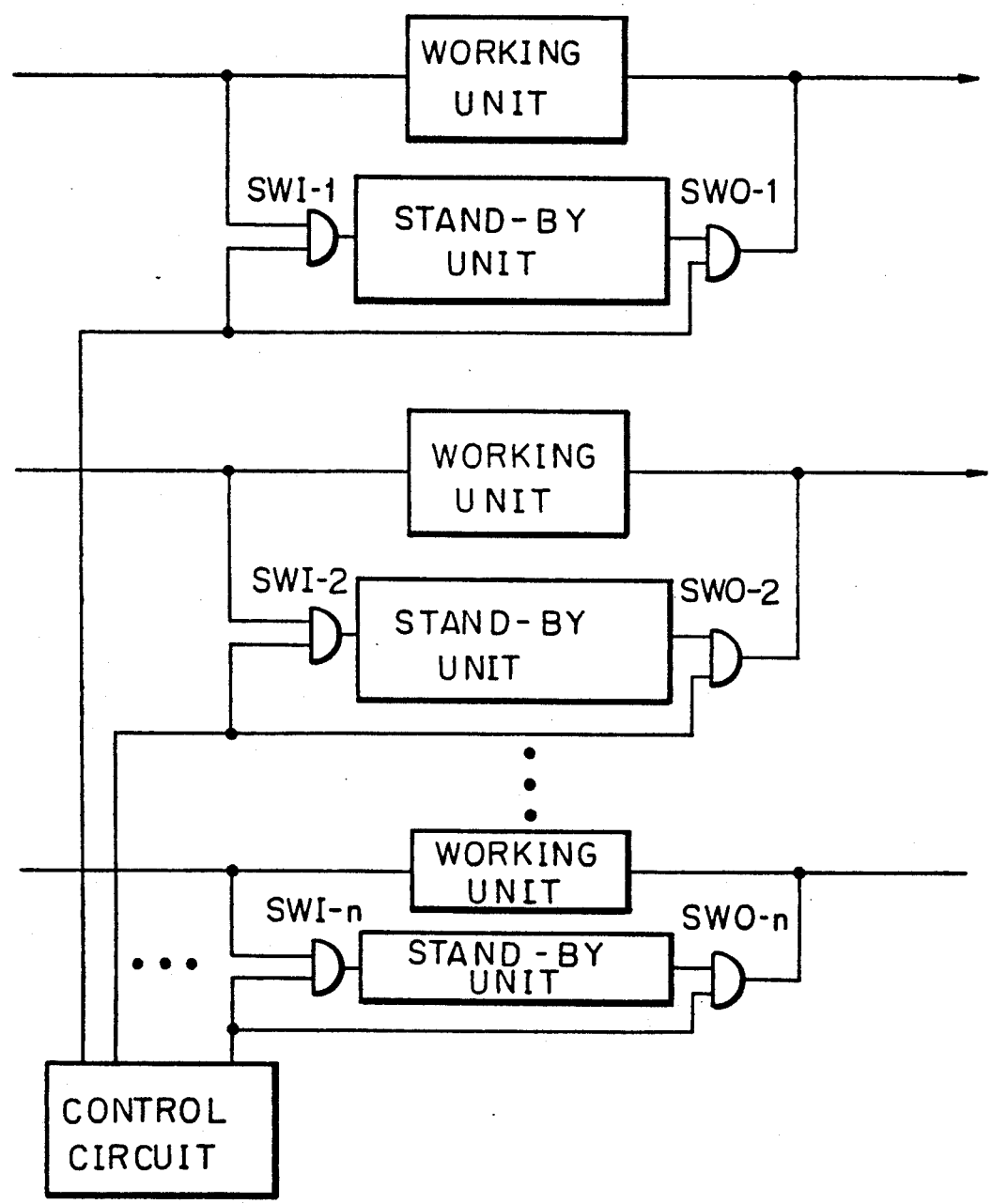
FIG. 2 shows the connections for individual stand-by units in the prior art.
Figure 3:
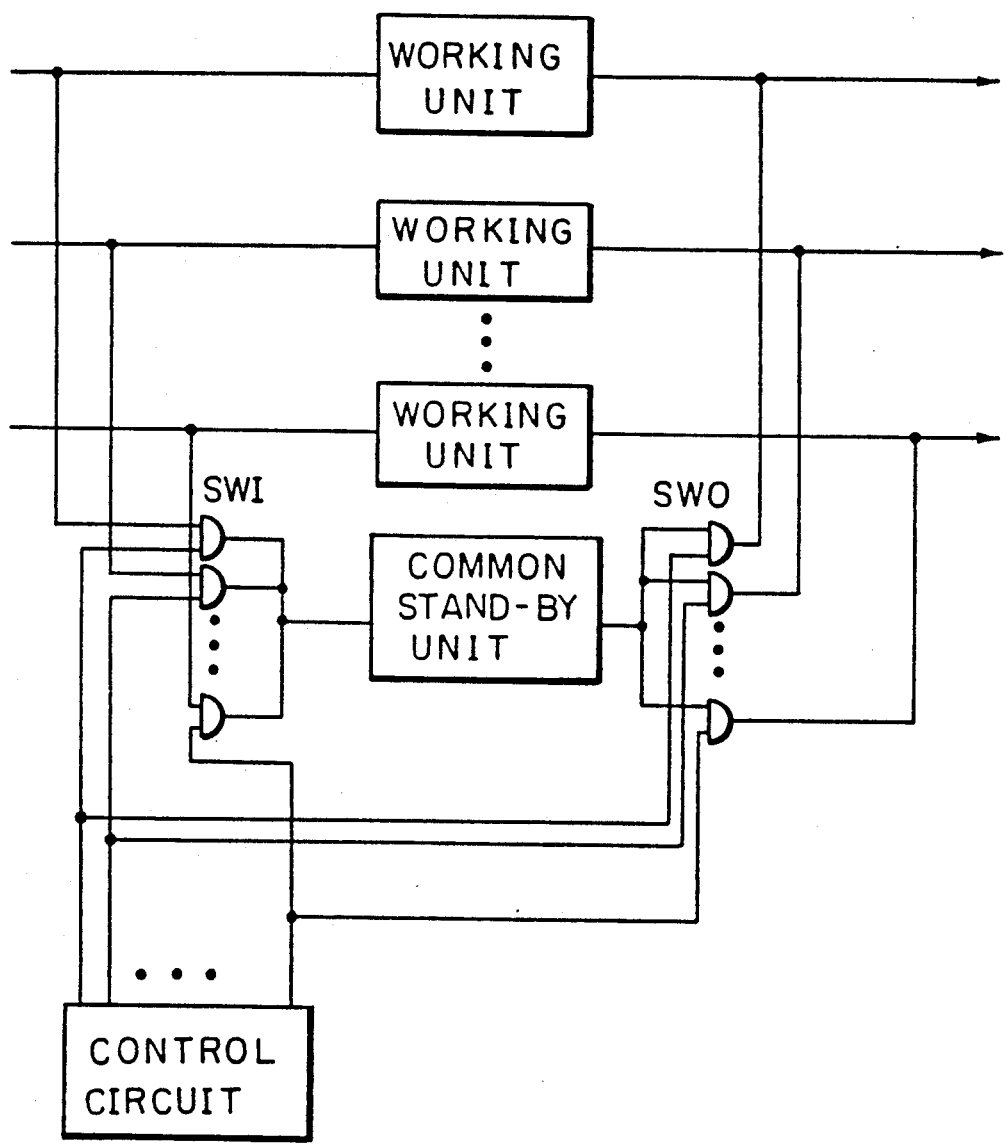
FIG. 3 shows the connections for a common stand-by unit in the prior art.

An embodiment of the present invention will be described in detail with reference to the accompanying drawings.

FIG. 4A is a block diagram showing an embodiment of the present invention.

The switching system as shown in FIG. 4A is provided with first, second and third portions or accommodation regions.

The first region accommodates $m$ number of working units 1—1 to 1—$m$ having an input side switching portion 2a and an output side switching portion 2b; and provided for the respective working units 1—1 to 1—$n$ are $n$ number of stand-by units 3—1 to 3—$n$ having an input side switching portion 4a and an output side switching portion 4b.

The second region accommodates at least one common stand-by unit 3A. The working units 1—1 to 1—$m$, the stand-by units 3—1 to 3—$n$, and the common stand-by unit 3A have the same structure. When a multiplexer unit is formed, a plurality of input lines are connected through switching portions to the input side, and a plurality of output lines are connected through switching portions to the output side.

Assuming that the working unit 1—1 has a high degree of importance, then a stand-by unit 3—1 is provided for the working unit 1—1 and the switching portions 2a and 4a are connected to the input side, for example, to a plurality of input lines, while the switching portions 2b and 4b are connected to the output side, for example, to a multiplex transmission line. In this case the switching portions 2a, 2b, 4a, and 4b are provided with a switching structure corresponding to the structure of the input lines and the multiplex line.

A switching nit 5 composed of only a switching portion is provided for each of the working units 1—$n$+1 to 1—$m$. The input lines for each working unit 1—$n$+1 to 1—$m$ are connected through a switching portion of the corresponding switching unit 5 to the input side of the common stand-by unit 3A, and a multiplex line for each working unit 1—$n$+1 to 1—$m$ is connected through a switching portion of the corresponding switching unit 5 to the output side of the common stand-by unit 3A. In this case, the switching portion of the switching unit 5 is comparable to the switching portions 4a and 4b of the stand-by units 3—1 to 3—$n$.

A control unit 6 receives fault detection data from the working units 1—1 to 1—$m$ and the corresponding stand-by units, and outputs switching signals for controlling the switching portions 2a, 2b, 4a, 4b and the switching portion of the switching units 5.

Since the stand-by unit 3—1 is provided for the working unit 1—1, the working unit 1—1 has a l-to-l structure for working unit-stand-by unit switching and when a fault occurs in the working unit 1—1, connection of the input lines and multiplex line for working unit 1—1 is switched to the stand-by unit 3—1. Connection of the working units 1—$n$+1 to 1—$m$ is switched through the corresponding switching unit 5 to the common stand-by unit 3A. Therefore, if $m-n=k$, a $k$-to-1 working unit-stand-by unit switching structure can be realized. Thus, when a fault occurs in any one of the working units 1—$n$+1 to 1—$m$, connection of an input line and a multiplex line of the working unit in which a fault has occurred are switched to the common stand-by unit 3A by the switching unit 5 corresponding thereto.

Figure 4C:
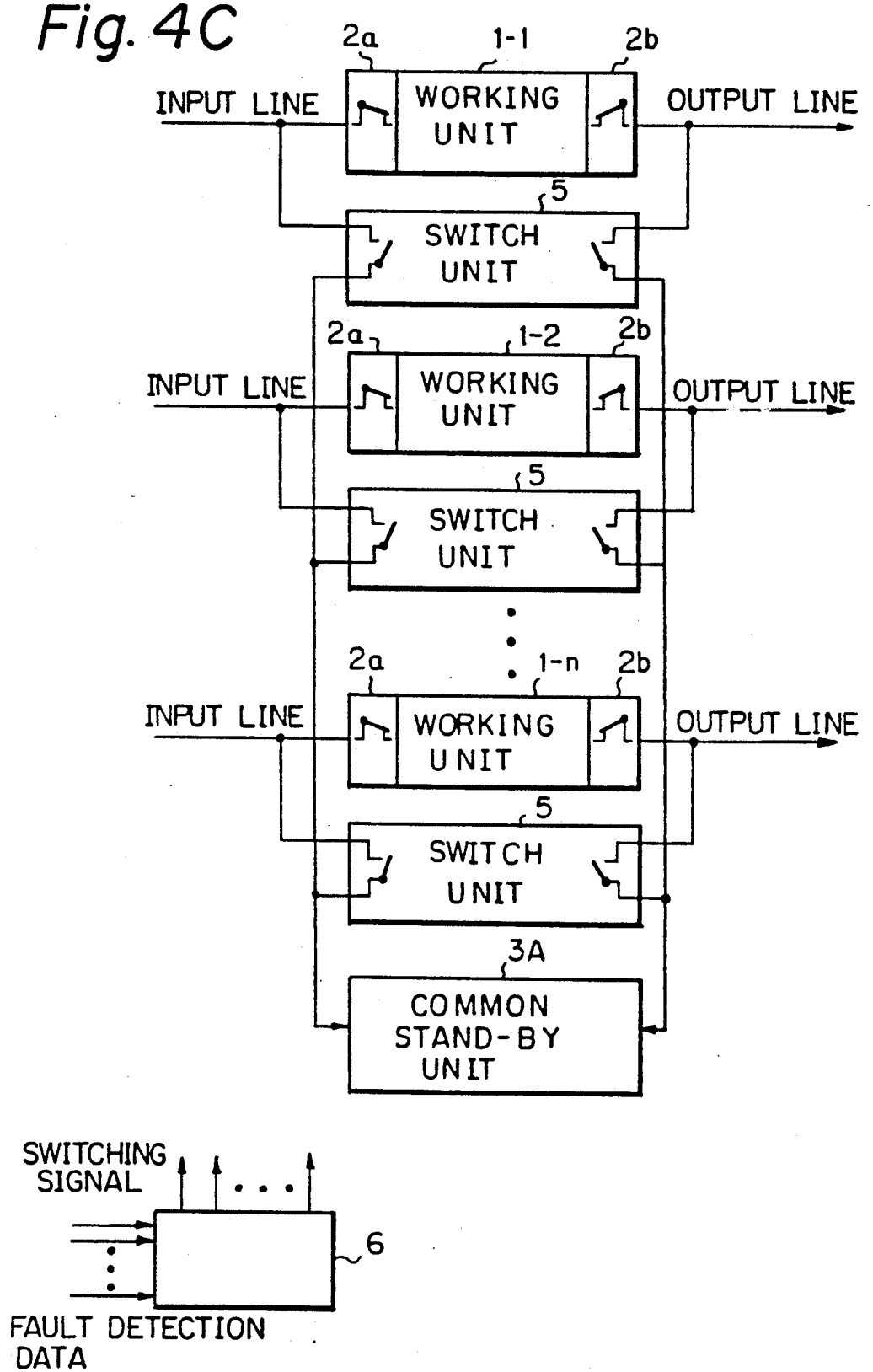

The individual stand-by portion of this embodiment shows a case of an individual stand-by portion having a high degree of importance wherein the stand-by units 3—1 to 3—$n$ are accommodated for the working units 1—1 to 1—$n$ and all of the working units 1—1 to 1—$n$ are formed by a 1-to-1 working unit and stand-by unit switching structure. Therefore, the common stand-by unit 3A (as shown in FIG. 4C) is unnecessary. Similarly, there may be a case where all of the working units are in the common stand-by portion in FIG. 4A, and in this case the working units 1—$n$+1 to 1—$m$ and the common stand-by unit 3A will form a $k$-to-1 switching structure between the working units and the stand-by unit where $k=m-n$.

FIG. 4B is a block diagram showing a second embodiment of the present invention. In FIG. 4B, the stand-by units 3—1 to 3—$n$ which make a pair with the respective working units are accommodated responsive to the working units 1—1 to 1-$n$, so all of the working units 1—1 to 1—$n$ have a 1-to-1 working unit versus stand-by unit switching structure. Therefore, the space for the common stand-by unit 3A which is illustrated by broken lines is not accommodated therewith.

Pairs of working units 1—1 to 1—$n$ are connected to corresponding and stand-by units 3—1 to 3—$n$ on the input sides and output sides. The stand-by units 3—1 to 3—$n$ and common stand-by unit 3A are connected commonly on the input sides and output sides. Of course, a control unit 6 is provided.

FIG. 4C is a block diagram showing a third embodiment of the present invention. In FIG. 4C, the corresponding switching units 5 are provided in the accommodation region of the stand-by units responsive to the working units 1—1 to 1—$n$ and further a common stand-by unit 3A is provided therewith, so an $n$-to-1 working unit versus stand-by unit switching structure is formed. The switching units 5 which occupy $n$ locations corresponding to the working units 1—1 to 1—$n$ and a common stand-by unit 3A are connected on the input side and the output side to each other. The working units 1—1 to 1—$n$ are connected to corresponding switching units 5 on the input side and the output side.

Furthermore, m regions for accommodating the common stand-by unit 3A may be provided, and the working units 1—1 to 1—n may be divided into m plurality groups and a common stand-by unit 3A may be accommodated for each group to form an n-to-m switching structure between the working units and the stand-by units.

The foregoing described embodiments relate to multiplexer equipment, but can be also applied to demultiplexer equipment.

As can be understood from the above description, a switching system for switching from a unit or units in a working state to a unit or units in a stand-by state is provided as either individual stand-by units or as a common stand-by unit, and an individual stand-by unit or a switching unit can be accommodated so that it forms a pair with a working unit and working unit or units which are connected to a switching unit, so that when a failure of the working unit or units occurs, the unit or units are automatically connected to a common stand-by unit.

Further it can be seen that the working unit consists of a plurality of working units, and the switching to an individual stand-by unit and the switching to a common stand-by unit can be selected according to need.

Moreover, each of the working units and stand-by units is a multiplexing or demultiplexing operation unit able to carry out a multiplexing operation for a plurality of data received through an input line to output multiplexed data to an output line.

Regarding the switching system in accordance with the present invention, it is understood that a switching from working units to stand-by units can be carried out only by a working/stand-by control, regardless of the individual stand-by connection or common stand-by connection.

More particularly, the switching system for switching from a unit or units in a working state to a unit or units in a stand-by state, in which the units in a stand-by state are provided as either individual stand-by units or as a common stand-by unit, each of the working units having a higher importance being provided with an individual stand-by units and each of working units having a lesser importance being provided with a switching unit, a plurality of the working units having a lesser importance being provided with a common stand-by unit, and a control unit being provided for controlling the switching from working units to stand-by units based on failure detection signals, whereby switching control signals from the control unit are supplied to the individual stand-by units or the switching units, and to the common stand-by units so that the switching from working units to the individual stand-by units or the common stand-by unit is carried out.

In the case of demultiplexer equipment, a multiplex line is connected to the input side and a plurality of transmission lines are connected to the output side. This may be also applied to repeater equipment or the like, and in that case, one transmission line is connected to both the input side and the output side.

Figure 5:
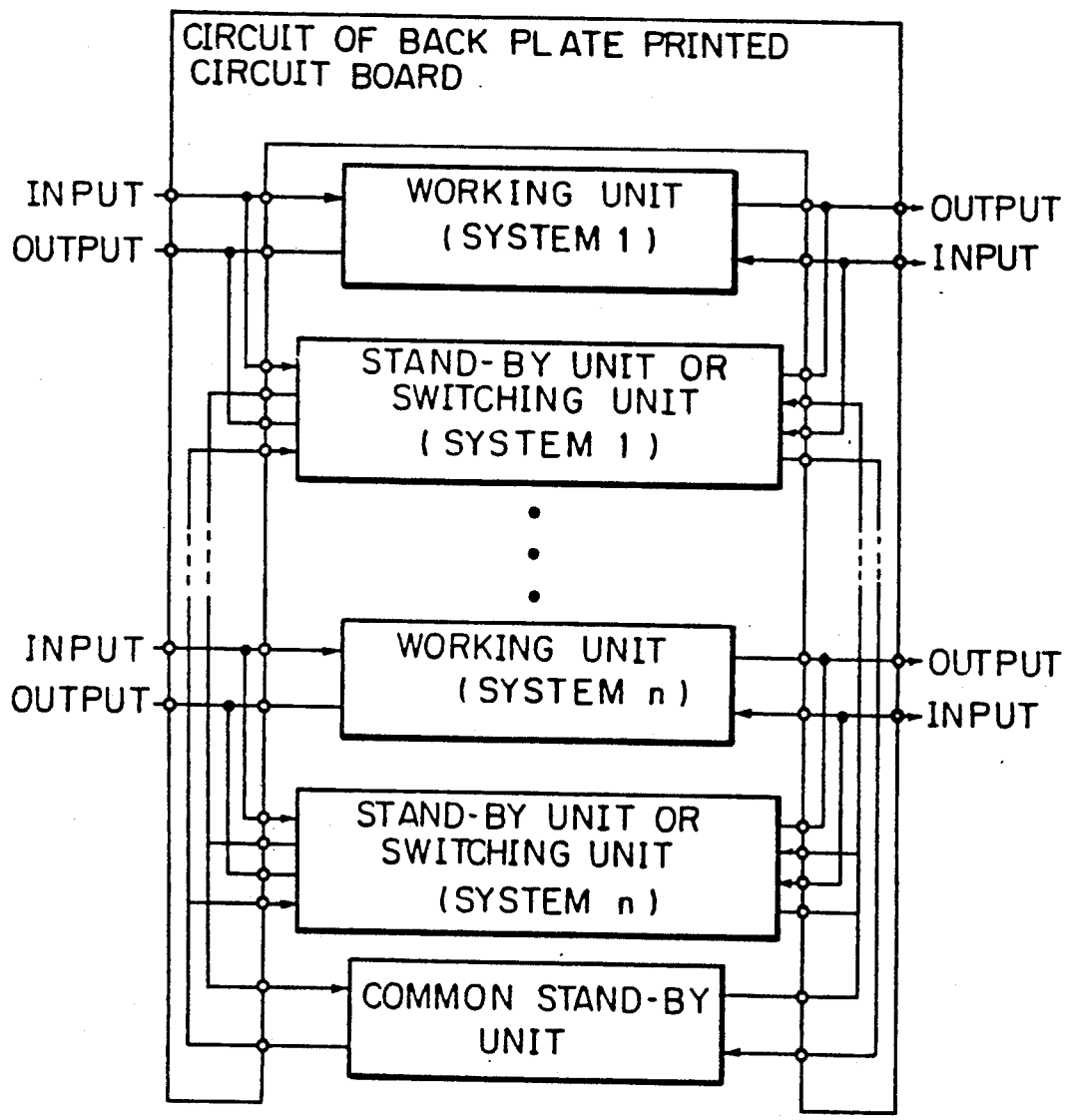
FIG. 5 is a wiring diagram showing an arrangement of working units and stand-by units relating to a back plate printed circuit board.

FIG. 5 illustrates a wiring diagram of a back plate printed circuit board, and shows a connection diagram of a system No. 1 to a system No. n; the relationship between working units, stand-by units, and a common stand-by unit is the same as in FIG. 4.

In the system according to the present invention, it is possible to adopt a shelf structure in which each stage of shelf plates are arranged perpendicular to the back plates and side walls at both sides. A number of units or unit plates are guided on rail means of the shelf plates and stopped by the back plates. A plurality of unit plates are inserted via guide means between supporting connectors and mounted vertically on the back board by means of a pair of connectors for supporting the unit plates.

Figure 6:
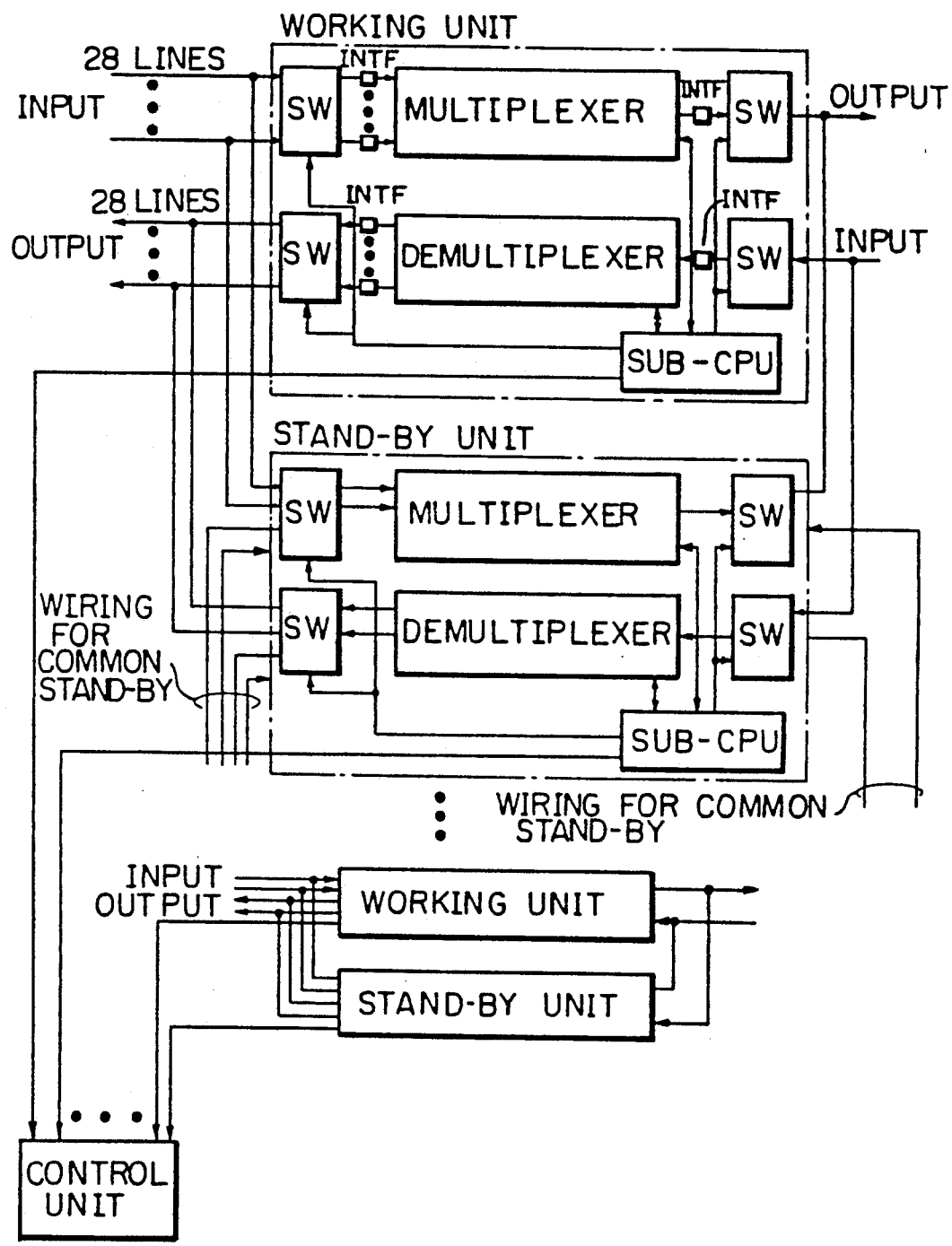
FIG. 6 shows a structure of a circuit for l-to-l switching.

FIG. 6 is a block diagram showing a 1-to-1 switching control system as an embodiment in accordance with the present invention.

Figure 7:
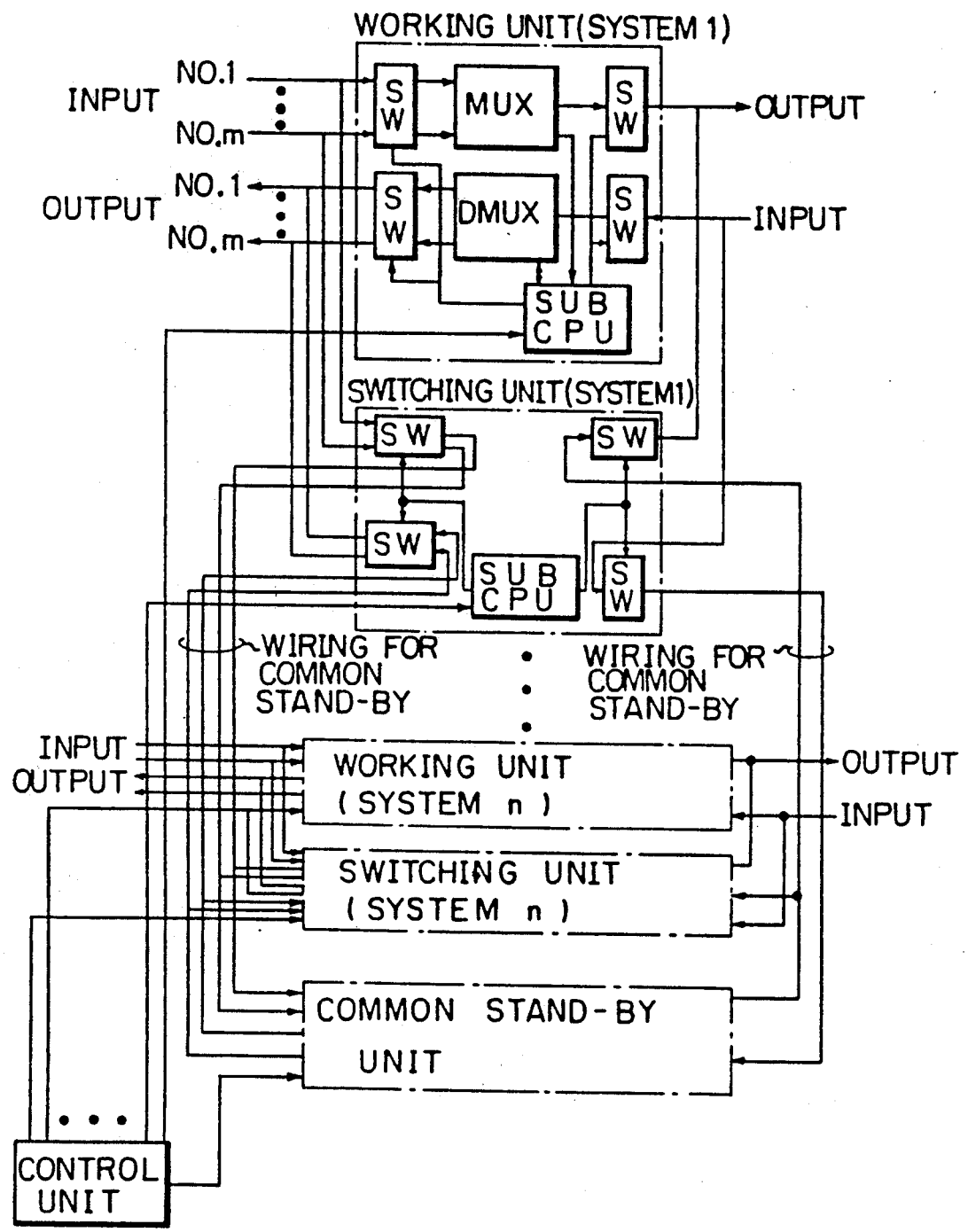
FIG. 7 shows a structure of a circuit for l-to-$n$ switching structure.

FIG. 7 is a block diagram showing a 1-to-n switching control system as an embodiment in accordance with the present invention.

FIG. 8A is a block diagram of a high speed switch element, FIG. 8B is a block diagram of a low speed output switch employing a tri-state integrated circuit, and FIG. 8C is an example of a switch circuit as illustrated in FIGS. 6 and 7.

FIG. 9 is a flow chart showing the operation of the switching system. After the alarm detection of a multiplexer or demultiplexer unit, a transmission line monitoring instruction is sent to the stand-by unit and switch from a control unit, and a determination of whether it is an external emergency or an internal emergency is carried out. In the case of a line alarm, a line alarm is displayed, and in the case of a unit alarm, a switching instruction is sent to the working unit and the stand-by unit from the control unit to realize a switching operation.

We claim:

1. A switching system for switching between at least one unit in a working state and at least one stand-by unit in a stand-by state, said system selectively operating each of the at least one stand-by unit as one of an individual stand-by unit and a common stand-by unit accessed by an individual switching unit, comprising:
   input/output lines for transmitting data;
   individual units, each comprising one from among the individual stand-by unit and the individual switching unit, each individual stand-by unit and each individual switching unit including first switches connected to said input/output lines;
   working units, each including second switches operatively connected to said input/output lines, each of said working units corresponding to one of said individual units in a pair arrangement;
   failure detection means for providing fault detection signals indicating faults in said working units; and
   a control unit, operatively connected to said working and individual units and said failure detection means, for controlling switching between one of said working units and the corresponding one of said individual units based on the fault detection signals from said failure detection means, upon occurrence of a failure in the one of said working units, said second switches disconnecting said input/output lines from the one of said working units, said first switches connecting said input/output lines to the corresponding one of said individual units and, when the corresponding one of said individual units is the individual switching unit, said first switches connecting said input/output lines to the common stand-by unit.

2. A switching system according to claim 1, wherein one of a switching operation of individual stand-by units paired with each of said working units and a switching operation to a common stand-by unit is selectable in said control unit.

3. A switching system according to claim 1,
wherein said input/output lines includes input and output lines, and
wherein each of said working units and each of the stand-by unit carries out multiplex processing for a plurality of the input lines to deliver output data to the output lines.

4. A switching system according to claim 1, wherein when data having a high degree of importance is handled through at least two of said input/output lines operatively connected to one of said working units, the one of said working units is paired with the individual stand-by unit as the corresponding one of said individual units.

5. A switching system according to claim 1, wherein said input/output lines include input and output lines connected to said first and second switches and said control unit controls said first and second switches to switch the input and output lines from one of said working units to the corresponding one of the individual units without detecting which of the individual stand-by unit and the individual switching unit is paired with the one of said working units.

6. A switching system according to claim 1,
wherein the common stand-by unit is included in said switching system, and
wherein said individual units include at least one individual stand-by unit connected to said input/output lines and said control unit, and at least one individual switching unit operatively connected to said input/output lines, the common stand-by unit and said control unit.

* * * * *

UNITED STATES PATENT AND TRADEMARK OFFICE
CERTIFICATE OF CORRECTION

PATENT NO. : 5,014,261

DATED : May 7, 1991

INVENTOR(S) : Shinbashi et al.

It is certified that error appears in the above-identified patent and that said Letters Patent is hereby corrected as shown below:

In the Drawings, Sheet 4 of 11, Fig. 4A, 7th block, change "1-1" to --1-n+1--;

9th block, change "1-2" to --1-n+2--;
11th block, change "1-n" to --1-m--.

Col. 3, line 40, "2b; and pro-" should be --2b. Pro- --.

Col. 4, line 4, after "the" (second occurrence) insert --corresponding--;
line 36, "FIG. 4A, and in" should be --FIG. 4A. In--;
line 37, "case" should be --case,--;

Col. 5, line 3, delete "plurality".

Signed and Sealed this

Thirteenth Day of October, 1992

Attest:

DOUGLAS B. COMER

Attesting Officer  Acting Commissioner of Patents and Trademarks